(12) United States Patent
Yuan et al.

(10) Patent No.: US 12,494,822 B2
(45) Date of Patent: Dec. 9, 2025

(54) UPLINK (UL) BEAM RESET AFTER MAXIMUM PERMISSIBLE EXPOSURE (MPE) REPORT

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/294,931

(22) PCT Filed: Oct. 12, 2021

(86) PCT No.: PCT/CN2021/123218
§ 371 (c)(1),
(2) Date: Feb. 2, 2024

(87) PCT Pub. No.: WO2023/060424
PCT Pub. Date: Apr. 20, 2023

(65) Prior Publication Data
US 2024/0429973 A1    Dec. 26, 2024

(51) Int. Cl.
*H04L 23/02* (2006.01)
*H04B 7/0404* (2017.01)
(Continued)

(52) U.S. Cl.
CPC .......... *H04B 7/0404* (2013.01); *H04B 7/063* (2013.01); *H04B 7/0695* (2013.01);
(Continued)

(58) Field of Classification Search
CPC . H04W 52/365; H04W 52/146; H04W 52/08; H04B 7/0695; H04B 7/088;
(Continued)

(56) References Cited

U.S. PATENT DOCUMENTS

| 11,240,766 B2 | 2/2022 | Raghavan et al. |
| 2021/0243630 A1 | 8/2021 | Bai et al. |

(Continued)

FOREIGN PATENT DOCUMENTS

| WO | 2019160669 | 8/2019 |
| WO | 2021146934 | 7/2021 |
| WO | 2021169829 | 9/2021 |

OTHER PUBLICATIONS

Intel Corporation: "Beam Management Enhancements for MPE", 3GPP TSG RAN WG1 Meeting #99, R1-1912185, Reno, USA, Nov. 18-Nov. 22, 2019, 2 Pages, Section 2 Proposal.
(Continued)

*Primary Examiner* — Khai Tran
(74) *Attorney, Agent, or Firm* — Patterson + Sheridan, L.L.P.

(57) ABSTRACT

Certain aspects of the present disclosure provide a method for wireless communication by a user equipment (UE). The UE transmits, to a network entity via a first beam, a maximum permissible exposure (MPE) report indicating a second beam. The UE then receives a response indicating an acknowledgment of the MPE report from the network entity. The UE then transmits an uplink (UL) transmission using the second beam to the network entity.

29 Claims, 12 Drawing Sheets

(51) Int. Cl.
  *H04B 7/06* (2006.01)
  *H04L 1/1812* (2023.01)
  *H04L 5/00* (2006.01)
  *H04W 52/36* (2009.01)

(52) U.S. Cl.
  CPC .......... *H04L 1/1812* (2013.01); *H04L 5/0055* (2013.01); *H04W 52/367* (2013.01)

(58) Field of Classification Search
  CPC . H04B 7/0628; H04B 7/06956; H04L 5/0055; H04L 5/001
  USPC ................................ 375/262, 260, 267, 299
  See application file for complete search history.

(56) References Cited

U.S. PATENT DOCUMENTS

| | | | |
|---|---|---|---|
| 2021/0243743 A1 | 8/2021 | Bai et al. | |
| 2021/0250227 A1* | 8/2021 | Bai .................... | H04W 36/305 |
| 2021/0297959 A1* | 9/2021 | Zhou ................. | H04W 72/0453 |
| 2022/0007448 A1* | 1/2022 | Ryu .................... | H04W 76/18 |
| 2022/0416977 A1* | 12/2022 | Farag .................... | H04W 52/42 |
| 2023/0031232 A1* | 2/2023 | Kiilerich Pratas .... | H04W 24/10 |
| 2023/0216565 A1* | 7/2023 | Kwak ................. | H04B 7/0695 |
| | | | 375/267 |

OTHER PUBLICATIONS

International Search Report and Written Opinion—PCT/CN2021/123218—ISA/EPO—Jun. 23, 2022.

* cited by examiner

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | \multicolumn{6}{c}{PH (Type 2, SpCell of the other MAC entity)} |
| MPE or R | | \multicolumn{6}{c}{$P_{CMAX,f,c}$ 1} |
| P | V | \multicolumn{6}{c}{PH (Type 1, PCell)} |
| MPE or R | | \multicolumn{6}{c}{$P_{CMAX,f,c}$ 2} |
| P | V | \multicolumn{6}{c}{PH (Type X, Serving Cell 1)} |
| MPE or R | | \multicolumn{6}{c}{$P_{CMAX,f,c}$ 3} |
| \multicolumn{8}{c}{...} |
| P | V | \multicolumn{6}{c}{PH (Type X, Serving Cell n)} |
| MPE or R | | \multicolumn{6}{c}{$P_{CMAX,f,c}$ m} |

FIG. 5

| P | R | PH(Type1, Pcell) |
|---|---|---|
| | | Pcmax,aci |
| MPE, or R | | |

FIG. 6

UPLINK (UL) BEAM RESET AFTER MAXIMUM PERMISSIBLE EXPOSURE (MPE) REPORT

CROSS-REFERENCE TO RELATED APPLICATIONS

This application is a national stage application under 35 U.S.C. 371 of PCT/CN2021/123218, filed Oct. 12, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for managing and resetting uplink (UL) beams based on a maximum permissible exposure (MPE) report.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for managing and resetting uplink (UL) beams based on a maximum permissible exposure (MPE) report.

Certain aspects of the subject matter described in this disclosure can be implemented in a method for wireless communications by a user equipment (UE). The method generally includes transmitting, to a network entity via a first beam, an MPE report indicating at least one second beam; receiving, from the network entity, a response indicating an acknowledgment of the MPE report; and transmitting, to the network entity, an UL transmission using the at least one second beam.

Certain aspects of the subject matter described in this disclosure can be implemented in an apparatus for wireless communications by a UE. The apparatus generally includes at least one application processor and a memory configured to: transmit, to a network entity via a first beam, an MPE report indicating at least one second beam; receive, from the network entity, a response indicating an acknowledgment of the MPE report; and transmit, to the network entity, an UL transmission using the at least one second beam.

Certain aspects of the subject matter described in this disclosure can be implemented in an apparatus for wireless communications by a UE. The apparatus generally includes means for transmitting, to a network entity via a first beam, an MPE report indicating at least one second beam; means for receiving, from the network entity, a response indicating an acknowledgment of the MPE report; and means for transmitting, to the network entity, an UL transmission using the at least one second beam.

Certain aspects of the subject matter described in this disclosure can be implemented in a computer readable medium storing computer executable code thereon for wireless communications by a UE. The computer readable medium generally includes code for transmitting, to a network entity via a first beam, an MPE report indicating at least one second beam; code for receiving, from the network entity, a response indicating an acknowledgment of the MPE report; and code for transmitting, to the network entity, an UL transmission using the at least one second beam.

Certain aspects of the subject matter described in this disclosure can be implemented in a method for wireless communications by a network entity. The method generally includes receiving, from a UE via a first beam, an MPE report indicating at least one second beam; transmitting, to the UE, a response indicating an acknowledgment of the MPE report; and receiving, from the UE, an UL transmission via the at least one second beam.

Certain aspects of the subject matter described in this disclosure can be implemented in an apparatus for wireless communications by a network entity. The apparatus generally includes at least one application processor and a memory configured to: receive, from a UE via a first beam, an MPE report indicating at least one second beam; transmit, to the UE, a response indicating an acknowledgment of the MPE report; and receive, from the UE, an UL transmission via the at least one second beam.

Certain aspects of the subject matter described in this disclosure can be implemented in an apparatus for wireless communications by a network entity. The apparatus generally includes means for receiving, from a UE via a first beam, an MPE report indicating at least one second beam; means for transmitting, to the UE, a response indicating an acknowledgment of the MPE report; and means for receiving, from the UE, an UL transmission via the at least one second beam.

Certain aspects of the subject matter described in this disclosure can be implemented in a computer readable medium storing computer executable code thereon for wireless communications by a network entity. The computer readable medium generally includes code for receiving, from a UE via a first beam, an MPE report indicating at least one second beam; code for transmitting, to the UE, a response indicating an acknowledgment of the MPE report; and code for receiving, from the UE, an UL transmission via the at least one second beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 5 illustrates example multi-cell PHR for a second set of cells, in accordance with certain aspects of the present disclosure.

FIG. 6 illustrates example single cell PHR, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
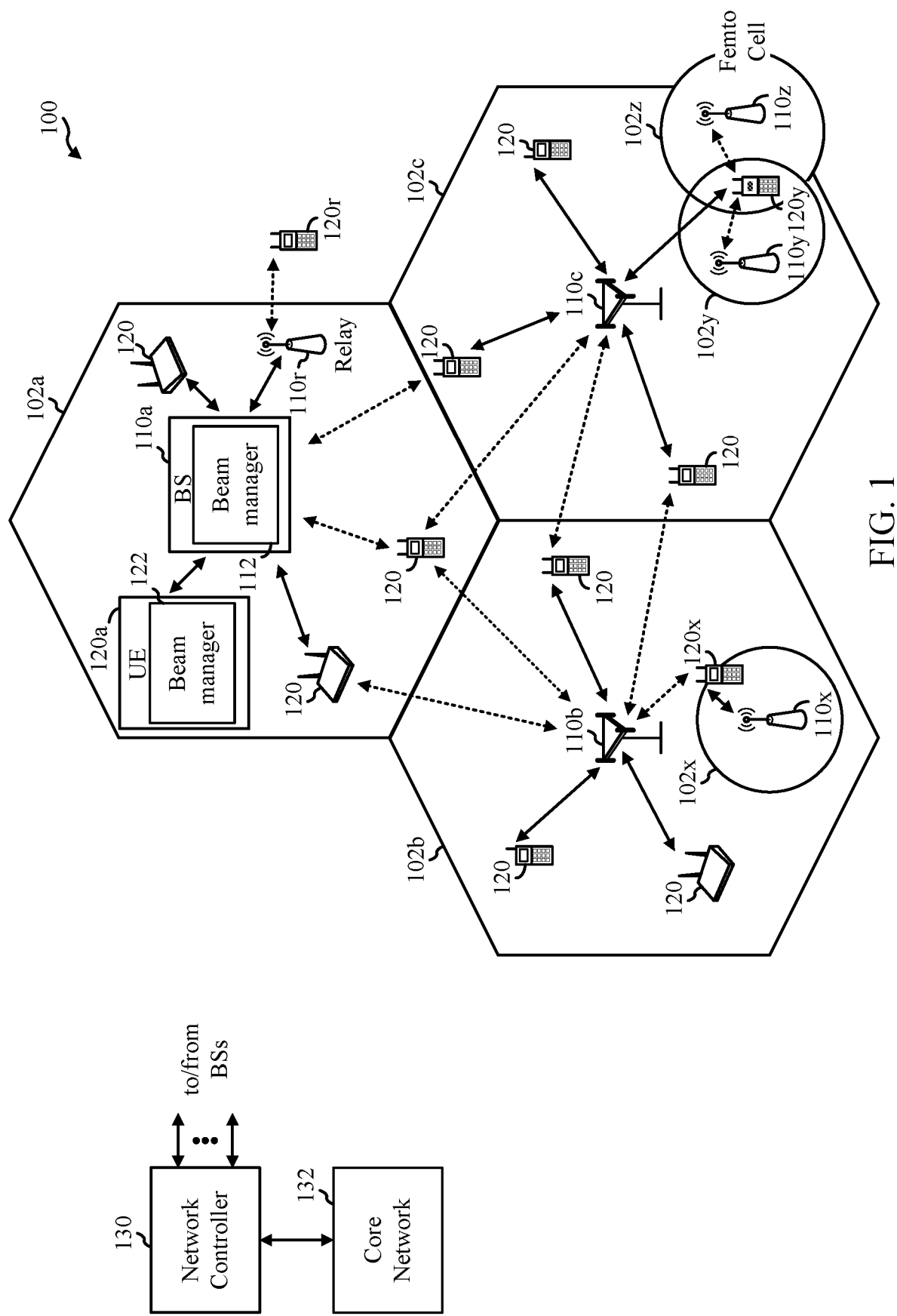
FIG. 1 is a block diagram conceptually illustrating an example wireless communication network, in accordance with certain aspects of the present disclosure.

Aspects of the present disclosure provide apparatuses, methods, processing systems, and computer readable mediums for managing uplink (UL) beams used for transmissions over one or more component carriers (CCs), in an effort to avoid maximum permissible exposure (MPE). In some aspects, UL beam resetting may be performed to reset UL beams used for UL transmissions to a cell, in order to avoid using the UL beams that may cause the MPE.

For example, a user equipment (UE) may detect an MPE event with a cell and/or on a related CC or an UL beam. The UE then generates and transmits an MPE report to a network entity. The UE resets the UL beam used for UL transmissions in the cell (and caused the MPE event), based on a new candidate UL beam for the cell indicated in the MPE report, after receiving a response to the MPE report from the network entity. The MPE report may be a medium access control (MAC) control element (CE) based power headroom (PH) report (PHR) with multiple power management maximum power reduction (P-MPR) values reported for different UL beams to the cell. After the reset, the UE sends the UL transmissions using the new candidate UL beam. The UL beam reset may avoid or mitigate the MPE.

Techniques described herein relate to MPE compliance when multiple CCs are configured for a UE. For example, the multiple CCs may be configured in a carrier aggregation (CA) where the UE may transmit over each of the multiple CCs with one or more cells to improve wireless communication reliability. The CCs may correspond to different bandwidths. The UE may consider multiple CCs, and reset UL beams for the multiple CCs, which may help to avoid the MPE.

The following description provides examples of switching/resetting UL beams for less transmission interruption in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHZ). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120. As shown in FIG. 1, a UE 120a includes a beam manager 122 configured to perform operations 700 of FIG. 7, and a BS 110a includes a beam manager 112 configured to perform operations 800 of FIG. 8.

The wireless communication network 100 may be a new radio (NR) system (e.g., a 5$^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
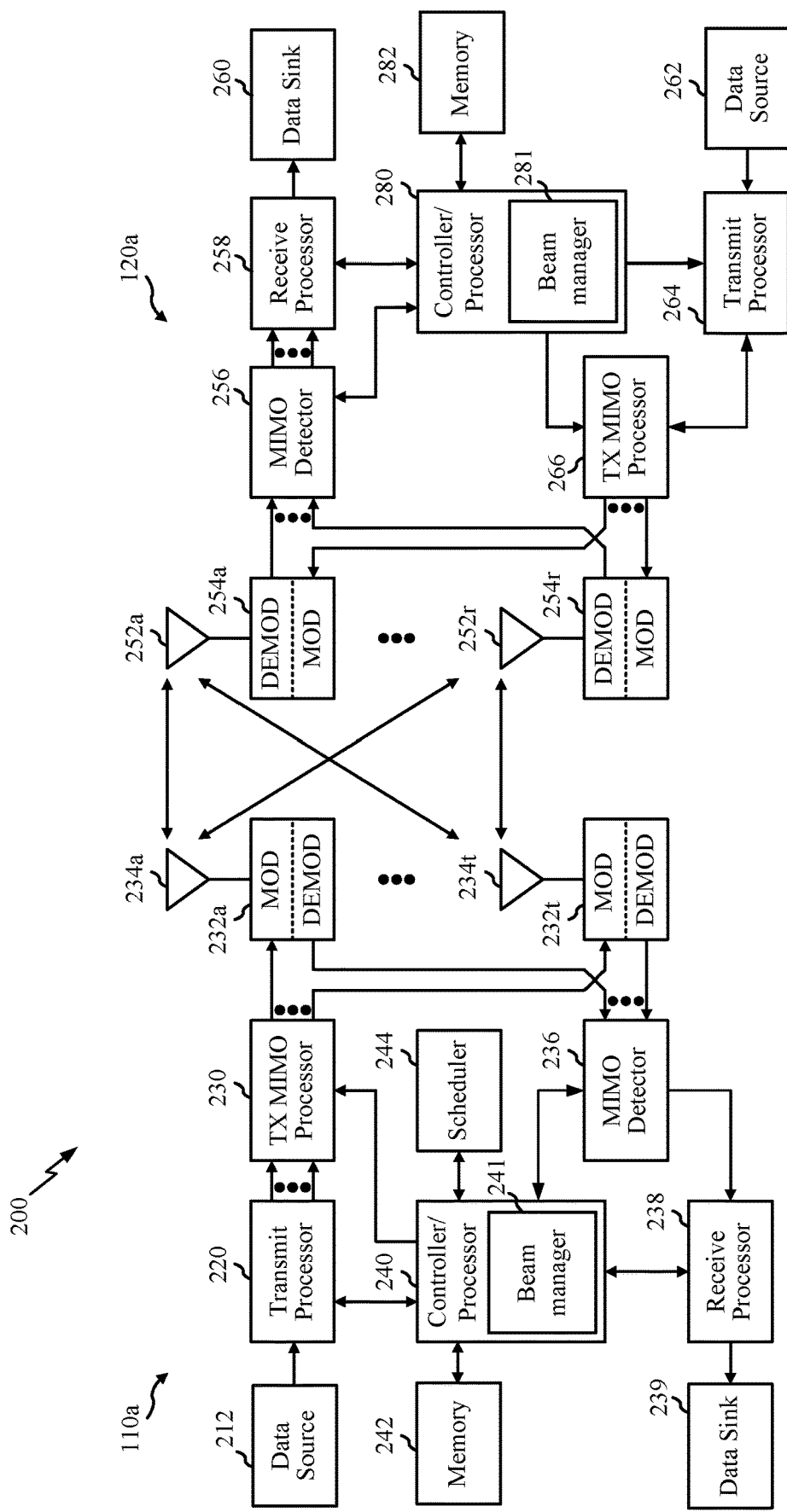
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 241 that may be configured to perform the operations illustrated in FIG. 8, as well as other operations disclosed herein. As shown in FIG. 2, the controller/processor 280 of the UE 120a has a beam manager 281 that may be configured to perform the operations illustrated in FIG. 7, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
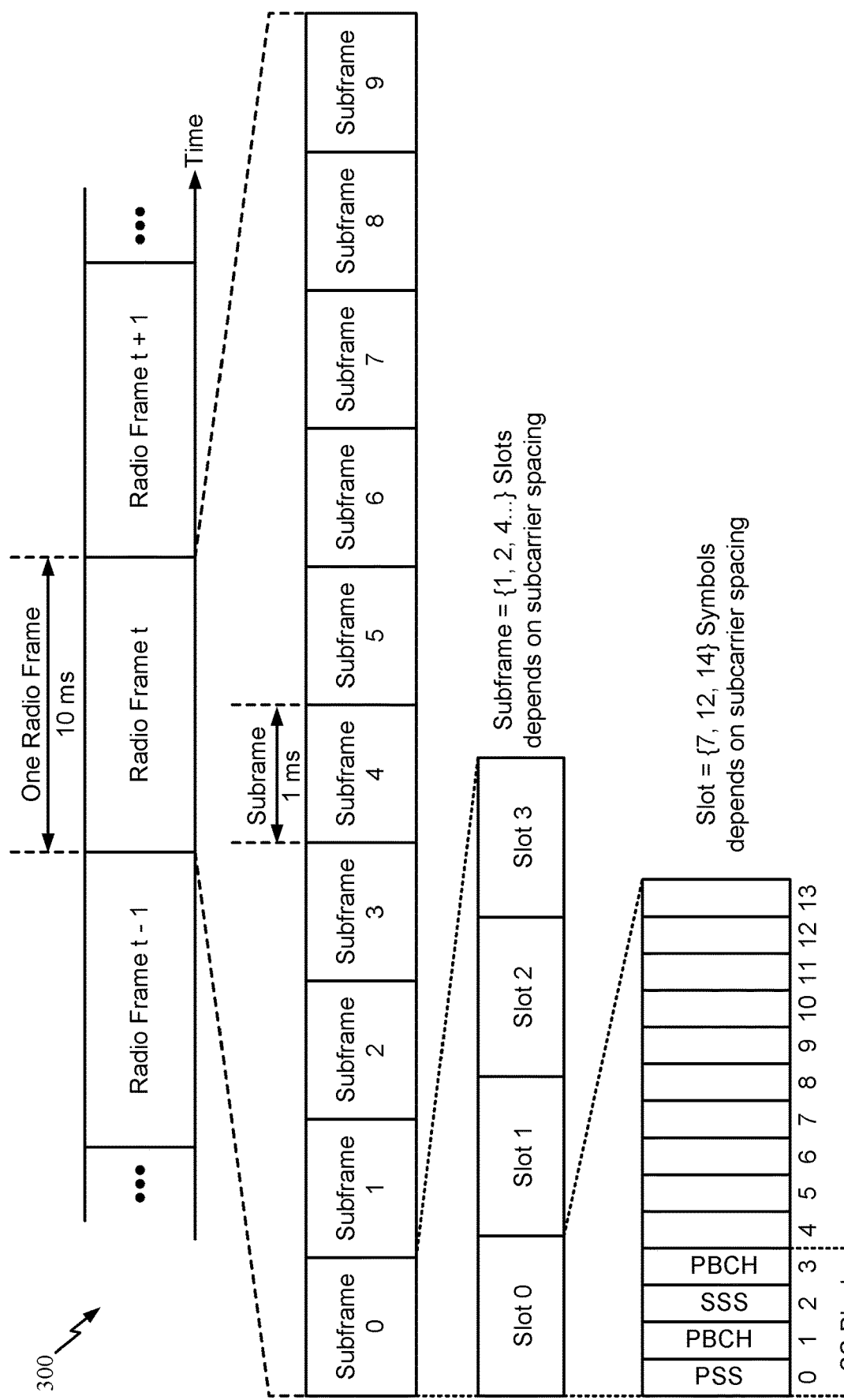
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Power Headroom (PH) Report (PHR) and Maximum Permissible Exposure (MPE) Report In new radio (NR), a user equipment (UE) sends a power headroom (PH) report (PHR) to a network entity (e.g., via a medium access control (MAC) control element (CE)). The PHR indicates PH available in the UE (e.g., how much of a maximum transmit power is left for the UE to use in addition to the power already being used by a current transmission).

In some cases, the PHR also indicates power management maximum power reduction (P-MPR) values. A P-MPR value may correspond to a power reduction amount (e.g., when the UE may perform power reduction or power backoff to determine uplink (UL) transmit power for a certain serving cell). The P-MPR value may be UL beam specific. For example, different UL beams may have different P-MPR values. The P-MPR value may be UL panel specific. For example, different UL panels may have different P-MPR values. A panel specific P-MPR value may be common to multiple UL beams associated with the same panel. In some cases, along with a P-MPR value corresponding to an UL beam, the UE may also report a synchronization signal block (SSB) resource index (SSBRI) or a channel resource index (CRI) of a candidate UL beam in the PHR.

Figure 4:
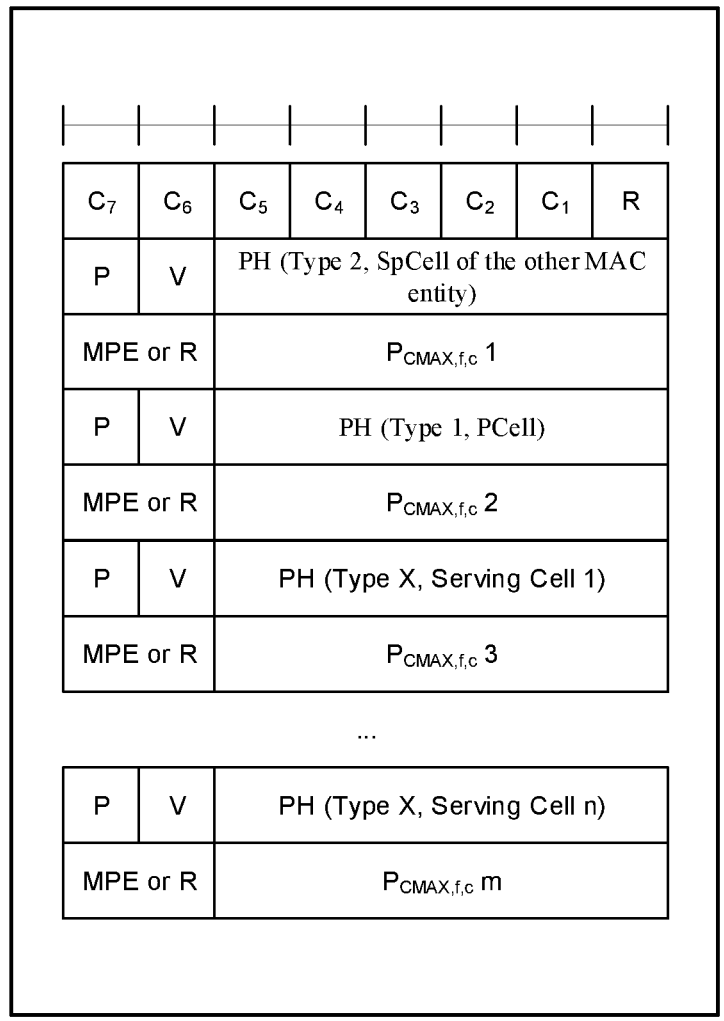
FIG. 4 illustrates example multi-cell power headroom report (PHR) for a first set of cells, in accordance with certain aspects of the present disclosure.
Figure 6:
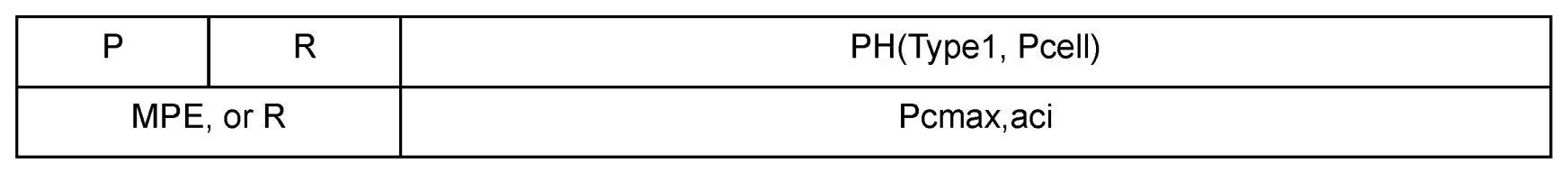

The PHR may be for a single cell or multiple cells. Examples of multi-cell PHRs for different sets of cells are shown in FIGS. 4 and 5. A single-cell PHR is illustrated in FIG. 6. In the single cell PHR and the multi-cell PHRs, C field indicates a serving cell, V field indicates if a PH value is based on a real UL transmission or a reference format, R field indicates a reserved bit, PH field indicates a PH level, P field indicates whether the UE has applied some power reduction for UL transmissions or not, and Pcmax,f,c field indicates Pcmax,f,c used for calculating a preceding PH field.

In some cases, the UE can be mandated to comply with maximum permissible exposure (MPE) to prevent exposure of radio waves to humans. The UE may accordingly detect MPE events and apply power reduction to prevent possible harm caused by strong radio signals. In some cases, when an MPE report is configured and the UE may have applied some amount of power reduction for UL transmissions (e.g., the P field is set as P=1), then as illustrated in FIGS. 4-6, the UE may include an MPE value (e.g., a power backoff value) applied to meet MPE requirements in the PHR.

In some cases, in addition to existing fields (e.g., a first set of P field, V field, PH field, MPE or P-MPR field, and/or Pcmax,f,c field) in a MAC-CE for reporting PHR for a cell, a number of N additional P-MPR values may be reported in the same MAC-CE for the cell. For each additional P-MPR value, there may be up to a number of M SSBRI(s)/CRI(s), where the SSBRI/CRI is selected by the UE as a candidate UL beam from a candidate resource pool of SSB or CSI-RS resources. In one example, the value of M may be 1. The N may be defined as a number of reported measurements in the MAC-CE for the PHR. The UE may report a large N value as a UE capability.

Example UL Beam Reset after MPE Report

Aspects of the present disclosure provide apparatuses, methods, processing systems, and computer readable mediums for managing uplink (UL) beams over one or more component carriers (CCs) to avoid maximum permissible exposure (MPE).

In some aspects, UL beam resetting may be performed to reset UL beams used for UL transmissions to a cell, in order to avoid using the UL beams that may cause the MPE. For example, a user equipment (UE) sends an MPE report to a network entity (e.g., when the UE may detect an MPE event in UL). The UE resets an UL beam used for UL transmissions in a cell, based on a new candidate UL beam for the cell indicated in the MPE report, after receiving a response to the MPE report from the network entity. After the reset, the UE sends the UL transmissions using the new candidate UL beam. The UL beam reset may avoid or mitigate the MPE.

Figure 7:
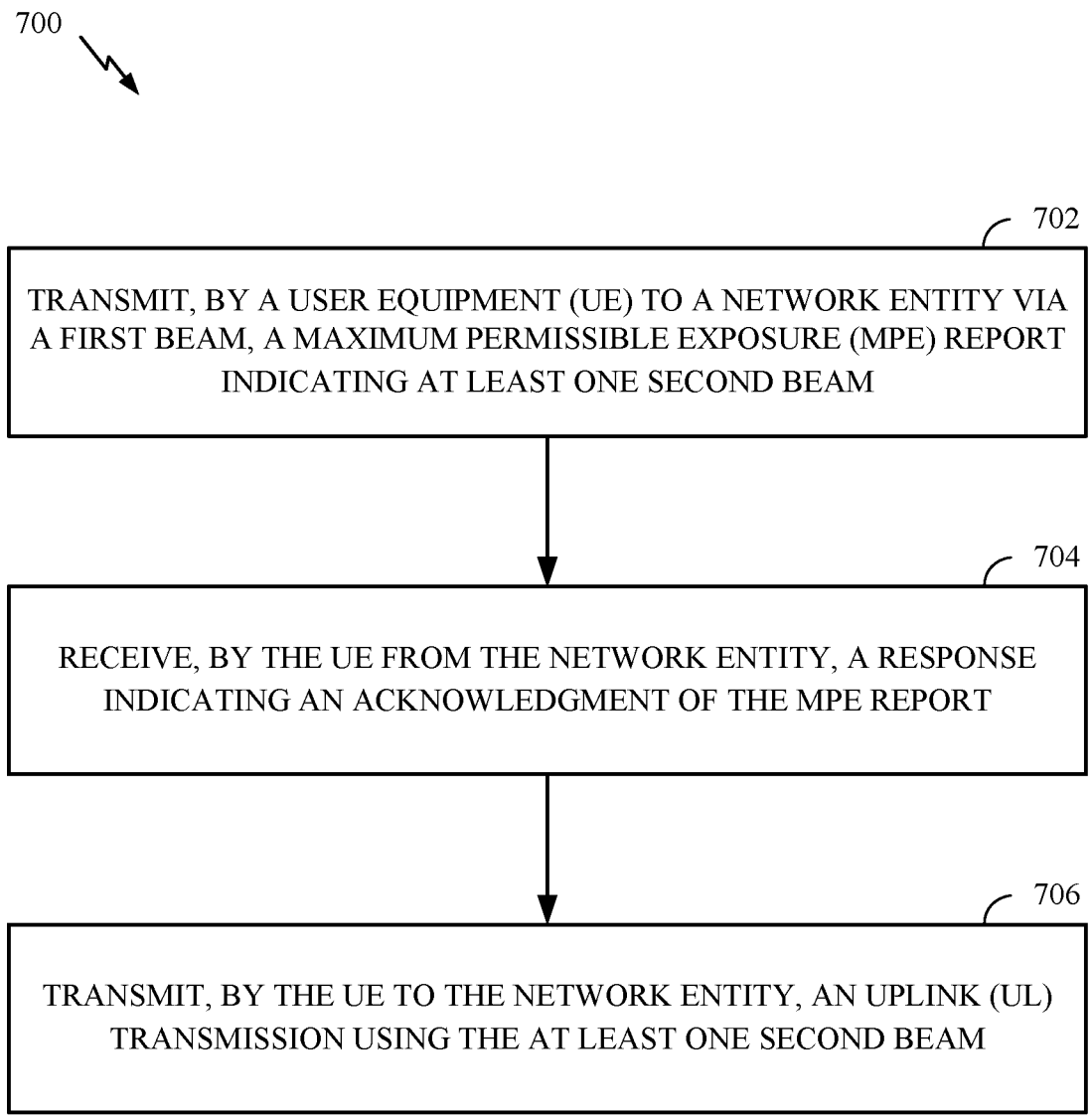
FIG. 7 is a flow diagram illustrating example operations for wireless communications by a UE, in accordance with certain aspects of the present disclosure.

FIG. 7 is a flow diagram illustrating example operations 700 for wireless communication by a UE, in accordance with certain aspects of the present disclosure. The operations 700 may be performed, for example, by the UE 120a in the wireless communication network 100. The operations 700 may be implemented as software components that are executed and run on one or more processors (e.g., the controller/processor 280 of FIG. 2). Further, the transmission and reception of signals by the UE in operations 700 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 700 begin, at 702, by transmitting to a network entity via a first beam an MPE report indicating at least one second beam. For example, the UE may transmit the MPE report to the network entity using antenna(s) and transmitter/transceiver components of the UE 120a shown in FIG. 1 or FIG. 2 and/or of the apparatus shown in FIG. 11.

At 704, the UE receives from the network entity a response indicating an acknowledgment of the MPE report. For example, the UE may receive the response from the network entity using antenna(s) and receiver/transceiver components of the UE 120a shown in FIG. 1 or FIG. 2 and/or of the apparatus shown in FIG. 11.

At 706, the UE transmits to the network entity an UL transmission using the at least one second beam. For example, the UE may transmit the UL transmission to the network entity using antenna(s) and transmitter/transceiver components of the UE 120a shown in FIG. 1 or FIG. 2 and/or of the apparatus shown in FIG. 11.

Figure 8:
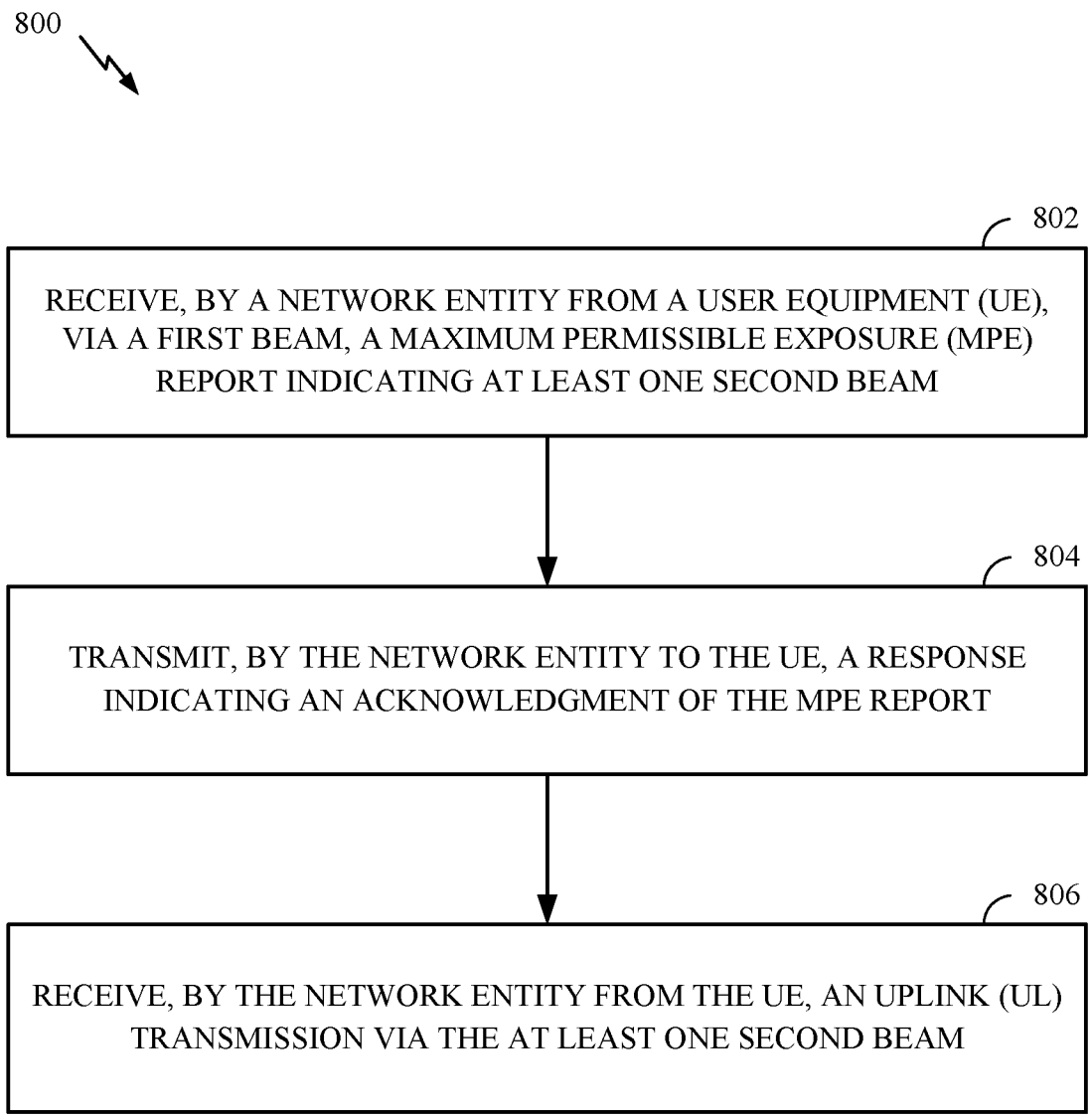
FIG. 8 is a flow diagram illustrating example operations for wireless communications by a network entity, in accordance with certain aspects of the present disclosure.

FIG. 8 is a flow diagram illustrating example operations 800 for wireless communication by a network entity, in accordance with certain aspects of the present disclosure. The operations 800 may be performed, for example, by a network entity (e.g., such as the BS 110a in the wireless communication network 100). The operations 800 may be implemented as software components that are executed and run on one or more processors (e.g., the controller/processor 240 of FIG. 2). Further, the transmission and reception of signals by the network entity in operations 800 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 800 begin, at 802, by receiving from a UE via a first beam an MPE report indicating at least one second beam. For example, the network entity may receive the MPE report from the UE using antenna(s) and receiver/transceiver components of the BS 110a shown in FIG. 1 or FIG. 2 and/or of the apparatus shown in FIG. 12.

At 804, the network entity transmits to the UE a response indicating an acknowledgment of the MPE report. For example, the network entity may transmit the response to the UE using antenna(s) and transmitter/transceiver components of the BS 110*a* shown in FIG. 1 or FIG. 2 and/or of the apparatus shown in FIG. 12.

At 806, the network entity receives from the UE an UL transmission via the at least one second beam. For example, the network entity may receive the UL transmission from the UE using antenna(s) and receiver/transceiver components of the BS 110*a* shown in FIG. 1 or FIG. 2 and/or of the apparatus shown in FIG. 12.

Figure 9:
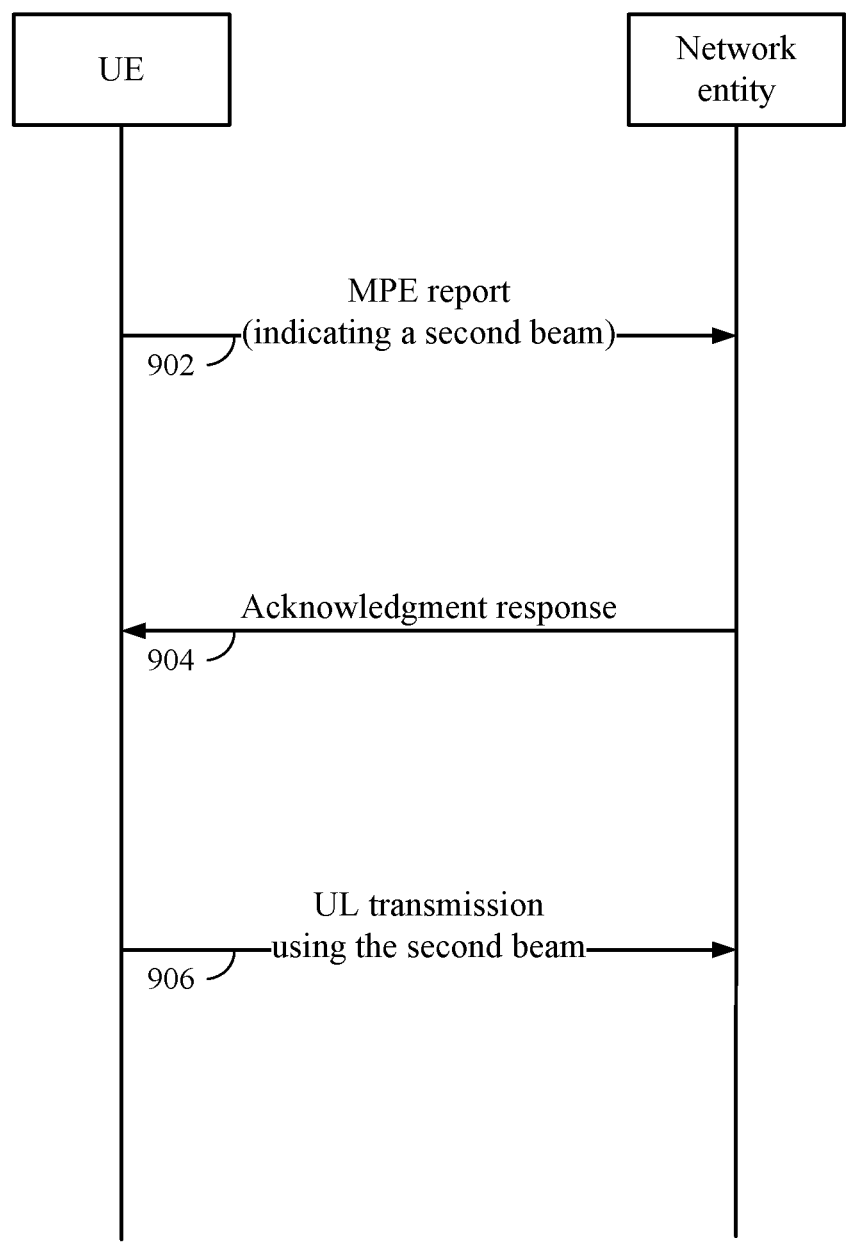
FIG. 9 is a call flow diagram illustrating example operations between a UE and a network entity, in accordance with certain aspects of the present disclosure.
Figure 10:
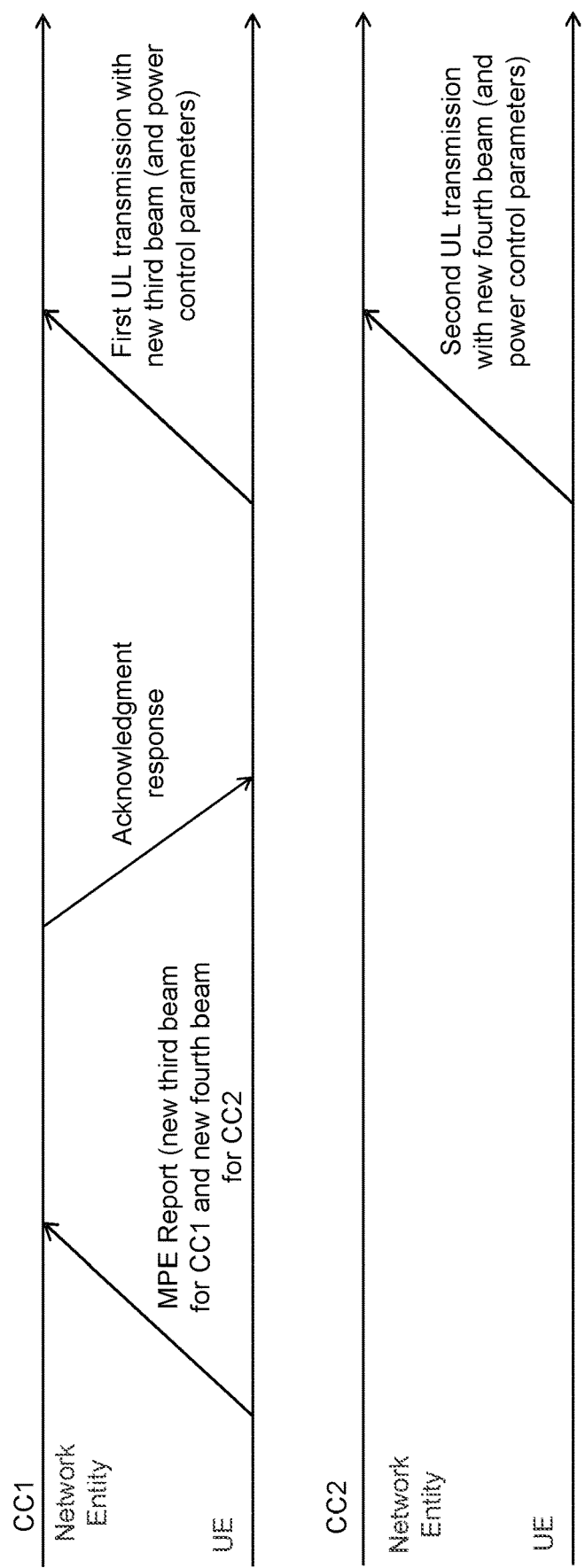
FIG. 10 illustrates example carrier aggregation (CA) scenario, in accordance with certain aspects of the present disclosure.

The operations shown in FIGS. 7-8 may be understood with reference to FIGS. 9-10.

As illustrated in FIG. 9, at 902, a UE transmits an MPE report to a network entity. The UE transmits the MPE report via a first beam. The MPE report indicates one or more new candidate UL beams (e.g., a second beam).

In certain aspects, the UE transmits the MPE report via a medium access control (MAC) control element (CE) in a physical uplink shared channel (PUSCH). The PUSCH (e.g., a first PUSCH) may be associated with a hybrid automatic repeat request (HARQ) identity document (ID).

In certain aspects, the UE transmits the MPE report with a power headroom report (PHR). For example, the MPE report may be a MAC CE PHR indicating multiple power management maximum power reduction (P-MPR) values for different UL beams or UL panels to a cell. In some cases, the UE may report in a MAC-CE with a first set of P field, V field, PH field, MPE or P-MPR field, and/or Pcmax,f,c field for a serving cell. The UE may also report a number of N additional P-MPR values in the same MAC-CE for the cell. In the MAC-CE, for each additional P-MPR value, there may be up to a number of M synchronization signal block (SSB) resource indexes (SSBRIs)/channel resource indexes (CRIs), where the SSBRI/CRI is selected by the UE as a candidate UL beam from a candidate resource pool of SSB or CSI-RS resources. In one example, the value of M may be 1. The N may be defined as a number of reported measurements in the MAC-CE for the PHR. The UE may include a large N value as a UE capability in the MPE report.

In certain aspects, the UE detects an MPE event (e.g., on one of multiple CCs configured with a cell in a carrier aggregation (CA)). In one example, the MPE event may occur or the MPE report may be triggered, when a value of pathloss has changed and is exceeding a threshold (e.g., a first threshold value). For example, the pathloss has changed more than a predetermined value of phr-Tx-PowerFactor-Change dB for at least one UL panel or one UL beam in an activated serving cell since a last transmission of the MAC-CE for the PHR or the MPE report. In another example, the MPE event may occur or the MPE report may be triggered, when a P-MPR value has changed and is exceeding a threshold (e.g., a second threshold value). For example, the P-MPR value for the UL panel or the UL beam has changed more than a predetermined value of phr-Tx-PowerFactor-Change dB since the last transmission of the MAC-CE for the PHR or the MPE report. In certain aspects, when the UE may detect the MPE event, the UE may then generate and transmit the MPE report to the network entity.

In certain aspects, the MPE report is triggered based on expiry of a timer for the MPR report or the PHR, and satisfaction of certain conditions. For example, the MPE report may be triggered when the timer expires and a change in pathloss or MPE has exceeded a threshold since a last transmission of the MAC-CE for the PHR or the MPE report. In another example, the MPE report may be triggered when the timer expires after a defined period of time. For example, the timer may be phr-PeriodicTimer, phr-ProhibitTimer, or mpe-ProhibitTimer.

At 904, the network entity transmits a response to the UE. The response indicates an acknowledgment of the MPE report.

In certain aspects, the network entity transmits the response via a downlink control information (DCI). The DCI may schedule another PUSCH. This PUSCH (e.g., a second PUSCH) is associated with a same HARQ ID as the first PUSCH that carried the MPE report to the network entity. The DCI may also indicate a new data assignment indicator. For example, the network entity response to the UE (e.g., enabling an UL beam resetting) may be an UL DCI scheduling a PUSCH of a HARQ ID (e.g., the HARQ ID may be same as for the PUSCH that carried the MPE report) but with a toggled new data assignment indicator.

At 906, the UE transmits an UL transmission to the network entity using the second beam. For example, when multiple candidate UL beams are reported in the MPE report, the UE may determine the second UL beam as one UL beam from the multiple candidate UL beams. For example, the second UL beam may be the one with a best metric among the multiple candidate UL beams. The best metric may be a largest PH value, or a smallest P-MPR value associated with the UL beam.

In certain aspects, the UE resets a current UL beam (e.g., switch from the first beam to the second beam indicated in the MPE report) for UL transmissions (e.g., for any of PUSCH transmissions, physical uplink control channel (PUCCH) transmissions, and/or sounding reference signal (SRS) transmissions) in different cells, after at least 28 symbols from a receipt of the DCI. For example, after the end of the DCI, the UE sends the UL transmission to the network entity using the second beam only after an offset (e.g., 28 symbols).

In certain aspects, when a CA configured, a sub carrier spacing (SCS) configuration for the 28 symbols is a smallest SCS configuration of SCS configurations of an active downlink (DL) bandwidth part (BWP) for a physical downlink control channel (PDCCH) reception and of active DL BWPs of: all cells in the CA configured to the UE or all cells with an MPE event reported in the MPE report.

In certain aspects, the UE resets the first beam for a cell, when the MPE report may indicate that the UE applied some power reduction for current UL transmissions in the cell, in addition to the second beam (e.g., when the P field P-bit is indicated as 1, and at least a new candidate UL beam is reported in the MPE report for the cell). In some aspects, the second beam may not be identical to the first beam.

In certain aspects, the UE resets the first beam for a cell, when the MPE report may indicate that a P-MPR value corresponding to the first beam is more than a threshold, the UE applied some power reduction for current UL transmissions in the cell, and the second beam (e.g., when the P field P-bit is indicated as 1, the MPE field P-MPR value corresponding to the current UL beam is more than a preconfigured threshold, and a new candidate UL beam is reported in the MPE report for the cell).

In certain aspects, the UE resets the first beam for a cell, when the MPE report may indicate that a PH value corresponding to the first beam is less than a threshold, the UE applied some power reduction for UL transmissions in the cell, and the second beam (e.g., when the P field P-bit is indicated as 1, the PH field PHR value corresponding to the current UL beam is less than a preconfigured threshold, and a new candidate UL beam is reported in the MPE report for the cell).

In certain aspects, in addition to a reset of the first UL beam for a cell, the UE may also reset power control parameters for uplink transmission of the cell. The power control parameters may include P0, alpha, closeloopindex, and path loss reference signal (PLRS). In one example, when the second beam is configured or associated with an UL or joint transmission configuration indicator (TCI), the UE may apply the power control parameters associated with the TCI for respective UL channels in the cell (e.g., when the second beam resets the first beam). In another example, when the second beam is not configured or associated with any UL or joint TCI, the UE may apply default power control parameters associated with the second beam for respective UL channels in the cell. For example, a first value of configured values for power control parameters such as P0, alpha, closeloopindex, and/or PLRS ID associated with the UL beam or UL panel configured for the UL channel may be applied.

In certain aspects, as illustrated in FIG. 10, an MPE report sent by a UE to a network entity indicates multiple new candidate UL beams (e.g., a third beam for a first CC (e.g., CC1) and a fourth beam for a second CC (e.g., CC2)). In this CA case, after receiving an acknowledgment response from the network entity, the UE transmits a first UL transmission using the third beam on the CC1 and a second UL transmission using the fourth beam on the CC2.

Example Wireless Communication Devices

Figure 11:
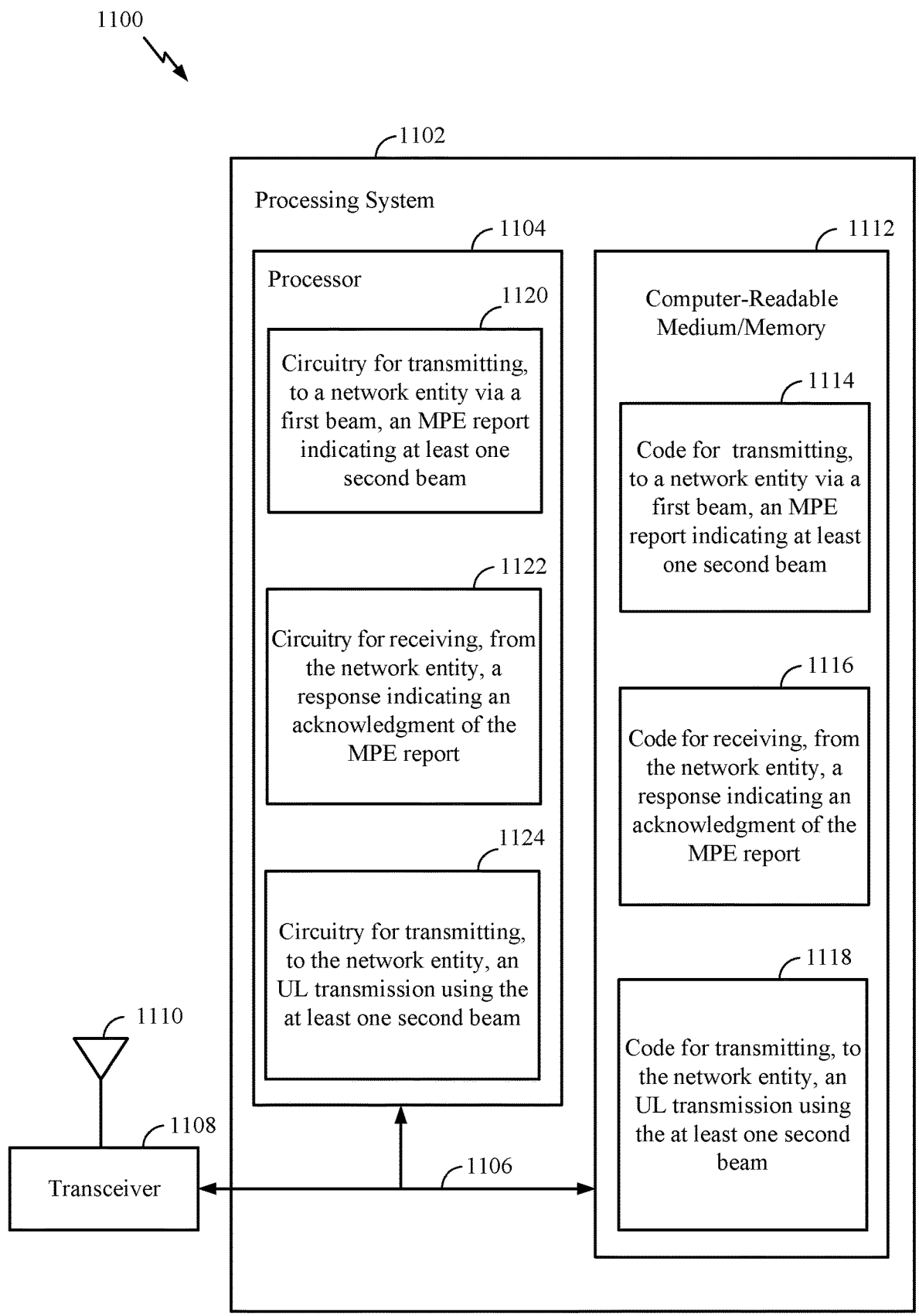
FIG. 11 illustrates a communications device that may include various components configured to perform operations for the techniques disclosed herein, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 is configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., a computer-executable code) that when executed by the processor 1104, cause the processor 1104 to perform the operations illustrated in FIG. 7, or other operations for performing the various techniques discussed herein. In certain aspects, computer-readable medium/memory 1112 stores code 1114 for transmitting, code 1116 for receiving, and code 1118 for transmitting. The code 1114 for transmitting may include code for transmitting to a network entity via a first beam an MPE report indicating at least one second beam. The code 1116 for receiving may include code for receiving from the network entity a response indicating an acknowledgment of the MPE report. The code 1116 for transmitting may include code for transmitting to the network entity an UL transmission using the at least one second beam.

The processor 1104 may include circuitry configured to implement the code stored in the computer-readable medium/memory 1112, such as for performing the operations illustrated in FIG. 7, as well as other operations for performing the various techniques discussed herein. For example, the processor 1104 includes circuitry 1120 for transmitting, circuitry 1122 for receiving, and circuitry 1124 for transmitting. The circuitry 1120 for transmitting may include circuitry for transmitting to a network entity via a first beam an MPE report indicating at least one second beam. The circuitry 1122 for receiving may include circuitry for receiving from the network entity a response indicating an acknowledgment of the MPE report. The circuitry 1124 for transmitting may include circuitry for transmitting to the network entity an UL transmission using the at least one second beam.

Figure 12:
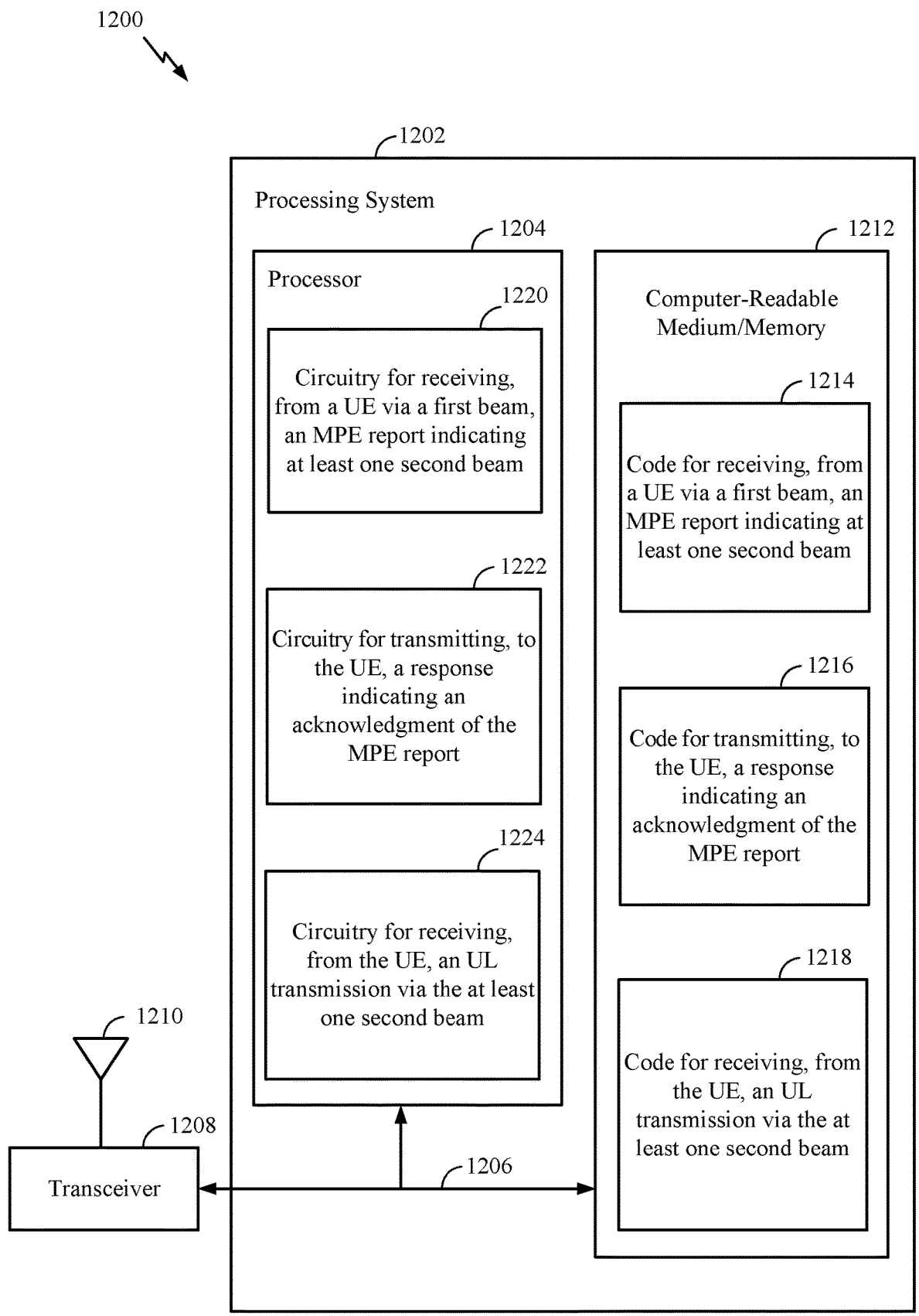
FIG. 12 illustrates a communications device that may include various components configured to perform operations for the techniques disclosed herein, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 (e.g., a transmitter and/or a receiver). The transceiver 1208 is configured to transmit and receive signals for the communications device 1100 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 8, or other operations for performing the various techniques discussed herein. In certain aspects, computer-readable medium/memory 1212 stores code 1214 for receiving, code 1216 for transmitting, and code 1218 for receiving. The code 1214 for receiving may include code for receiving from a UE via a first beam an MPE report indicating at least one second beam. The code 1216 for transmitting may include code for transmitting to the UE a response indicating an acknowledgment of the MPE report. The code 1216 for receiving may include code for receiving from the UE an UL transmission via the at least one second beam.

The processor 1204 may include circuitry configured to implement the code stored in the computer-readable medium/memory 1212, such as for performing the operations illustrated in FIG. 8, as well as other operations for performing the various techniques discussed herein. For example, the processor 1204 includes circuitry 1220 for receiving, circuitry 1222 for transmitting, and circuitry 1224 for receiving. The circuitry 1220 for receiving may include circuitry for receiving from a UE via a first beam an MPE report indicating at least one second beam. The circuitry 1222 for transmitting may include circuitry for transmitting to the UE a response indicating an acknowledgment of the MPE report. The circuitry 1224 for receiving may include circuitry for receiving from the UE an UL transmission via the at least one second beam.

Example Aspects

Implementation examples are described in the following numbered aspects.

In a first aspect, a method for wireless communications by a user equipment (UE), comprising: transmitting, to a network entity via a first beam, a maximum permissible exposure (MPE) report indicating at least one second beam;

receiving, from the network entity, a response indicating an acknowledgment of the MPE report; and transmitting, to the network entity, an uplink (UL) transmission using the at least one second beam.

In a second aspect, alone or in combination with the first aspect, the MPE report is transmitted via a medium access control (MAC) control element (CE) in a physical uplink shared channel (PUSCH), and wherein the PUSCH has a hybrid automatic repeat request (HARQ) identity document (ID).

In a third aspect, alone or in combination with one or more of the first and second aspects, the MPE report is transmitted with a power headroom report (PHR) indicating power management maximum power reduction (P-MPR) values for different UL beams to a cell.

In a fourth aspect, alone or in combination with one or more of the first through third aspects, the MPE report is transmitted in response to detecting an MPE event, on one of multiple component carriers (CCs) configured with a cell in a carrier aggregation (CA), indicating a change in at least one of pathloss or power management maximum power reduction (P-MPR) values beyond a threshold.

In a fifth aspect, alone or in combination with one or more of the first through fourth aspects, transmission of the MPE report is triggered when a timer associated with the MPE report has expired.

In a sixth aspect, alone or in combination with one or more of the first through fifth aspects, the response is received via a downlink control information (DCI) scheduling another PUSCH having a same HARQ ID as the PUSCH carrying the MPE report, and wherein the DCI indicates a new data assignment indicator.

In a seventh aspect, alone or in combination with one or more of the first through sixth aspects, the UE resets a current UL beam for UL transmissions in different cells, after at least 28 symbols from a receipt of the DCI.

In an eighth aspect, alone or in combination with one or more of the first through seventh aspects, a sub carrier spacing (SCS) configuration for the 28 symbols is a smallest SCS configuration of an active downlink (DL) bandwidth part (BWP) for a physical downlink control channel (PDCCH) reception and of active DL BWPs of: all cells in a carrier aggregation (CA) configured to the UE or all cells reported in the MPE report.

In a ninth aspect, alone or in combination with one or more of the first through eighth aspects, the UE resets a current UL beam for a cell, based on the at least one second beam indicated in the MPE report, when the MPE report at least indicates that the UE reduced power for UL transmissions using the current UL beam for the cell.

In a tenth aspect, alone or in combination with one or more of the first through ninth aspects, the MPE report further indicates a power management maximum power reduction (P-MPR) value corresponding to the current UL beam, and wherein the P-MPR value is more than a threshold.

In an eleventh aspect, alone or in combination with one or more of the first through tenth aspects, the MPE report further indicates a power headroom value corresponding to the current UL beam, and wherein the power headroom value is less than a threshold.

In a twelfth aspect, alone or in combination with one or more of the first through eleventh aspects, the UE resets power control parameters for the cell along with the reset of the current UL beam for the cell.

In a thirteenth aspect, alone or in combination with one or more of the first through twelfth aspects, the UE applies the power control parameters associated with a transmission configuration indicator (TCI) for UL channels in the cell, when the current UL beam is associated with the TCI.

In a fourteenth aspect, alone or in combination with one or more of the first through thirteenth aspects, the UE applies default values of the power control parameters associated with the current UL beam for UL channels in the cell, when the current UL beam is not associated with a transmission configuration indicator (TCI).

In a fifteenth aspect, alone or in combination with one or more of the first to fourteenth aspects, the MPE report further indicates a third beam for a first component carrier (CC1) and a fourth beam for a second component carrier (CC2).

In a sixteenth aspect, alone or in combination with one or more of the first to fifteenth aspects, the UE transmits a first UL transmission using the third beam on the CC1 and a second UL transmission using the fourth beam on the CC2.

In a seventeenth aspect, a method for wireless communications by a network entity, comprising: receiving, from a user equipment (UE) via a first beam, a maximum permissible exposure (MPE) report indicating at least one second beam; transmitting, to the UE, a response indicating an acknowledgment of the MPE report; and receiving, from the UE, an uplink (UL) transmission via the at least one second beam.

In an eighteenth aspect, alone or in combination with the seventeenth aspect, the MPE report is received via a medium access control (MAC) control element (CE) in a physical uplink shared channel (PUSCH), and wherein the PUSCH has a hybrid automatic repeat request (HARQ) identity document (ID).

In a nineteenth aspect, alone or in combination with one or more of the seventeenth and eighteenth aspects, the MPE report is received with a power headroom report (PHR) indicating power management maximum power reduction (P-MPR) values for different UL beams to a cell.

In a twentieth aspect, alone or in combination with one or more of the seventeenth to nineteenth aspects, the response is transmitted via a downlink control information (DCI) scheduling another PUSCH having a same HARQ ID as the PUSCH carrying the MPE report, and wherein the DCI indicates a new data assignment indicator.

In a twenty-first aspect, alone or in combination with one or more of the seventeenth to twentieth aspects, the MPE report further indicates a third beam for a first component carrier (CC1) and a fourth beam for a second component carrier (CC2).

In a twenty-second aspect, alone or in combination with one or more of the seventeenth to twenty-first aspects, the network entity receives a first UL transmission using the third beam on the CC1 and a second UL transmission using the fourth beam on the CC2.

An apparatus for wireless communication, comprising at least one processor; and a memory coupled to the at least one processor, the memory comprising code executable by the at least one processor to cause the apparatus to perform the method of any of the first through twenty-second aspects.

An apparatus comprising means for performing the method of any of the first through twenty-second aspects.

A computer readable medium storing computer executable code thereon for wireless communications that, when executed by at least one processor, cause an apparatus to perform the method of any of the first through twenty-second aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
transmitting, to a network entity via a first beam, a maximum permissible exposure (MPE) report indicating at least one second beam, wherein transmission of the MPE report is triggered when a timer associated with the MPE report has expired;
receiving, from the network entity, a response indicating an acknowledgment of the MPE report; and
transmitting, to the network entity, an uplink (UL) transmission using the at least one second beam.

2. The method of claim 1, wherein the MPE report is transmitted via a medium access control (MAC) control element (CE) in a physical uplink shared channel (PUSCH), and wherein the PUSCH has a hybrid automatic repeat request (HARQ) identity document (ID).

3. The method of claim 1, wherein the MPE report is transmitted with a power headroom report (PHR) indicating power management maximum power reduction (P-MPR) values for different UL beams to a cell.

4. The method of claim 1, wherein the MPE report is transmitted in response to detecting an MPE event, on one of multiple component carriers (CCs) configured with a cell in a carrier aggregation (CA), indicating a change in at least one of pathloss or power management maximum power reduction (P-MPR) values beyond a threshold.

5. The method of claim 2, wherein the response is received via a downlink control information (DCI) scheduling another PUSCH having a same HARQ ID as the PUSCH carrying the MPE report, and wherein the DCI indicates a new data assignment indicator.

6. The method of claim 5, wherein the UE resets a current UL beam for UL transmissions in different cells, after at least 28 symbols from a receipt of the DCI.

7. The method of claim 6, wherein a sub carrier spacing (SCS) configuration for the 28 symbols is a smallest SCS configuration of an active downlink (DL) bandwidth part (BWP) for a physical downlink control channel (PDCCH) reception and of active DL BWPs of: all cells in a carrier aggregation (CA) configured to the UE or all cells reported in the MPE report.

8. The method of claim 1, wherein the UE resets a current UL beam for a cell, based on the at least one second beam indicated in the MPE report, when the MPE report at least indicates that power reduction for UL transmissions using the current UL beam for the cell.

9. The method of claim 8, wherein the MPE report further indicates a power management maximum power reduction (P-MPR) value corresponding to the current UL beam, and wherein the P-MPR value is more than a threshold.

10. The method of claim 8, wherein the MPE report further indicates a power headroom value corresponding to the current UL beam, and wherein the power headroom value is less than a threshold.

11. The method of claim 8, wherein the UE resets power control parameters for the cell along with the reset of the current UL beam for the cell.

12. The method of claim 11, wherein the UE applies the power control parameters associated with a transmission configuration indicator (TCI) for UL channels in the cell, when the current UL beam is associated with the TCI.

13. The method of claim 11, wherein the UE applies default values of the power control parameters associated with the current UL beam for UL channels in the cell, when the current UL beam is not associated with a transmission configuration indicator (TCI).

14. The method of claim 1, wherein the MPE report further indicates a third beam for a first component carrier (CC1) and a fourth beam for a second component carrier (CC2).

15. The method of claim 14, wherein the UE transmits a first UL transmission using the third beam on the CC1 and a second UL transmission using the fourth beam on the CC2.

16. A method for wireless communications by a network entity, comprising:
receiving, from a user equipment (UE) via a first beam, a maximum permissible exposure (MPE) report indicating at least one second beam, wherein the MPE report is received when a timer associated with the MPE report has expired;
transmitting, to the UE, a response indicating an acknowledgment of the MPE report; and
receiving, from the UE, an uplink (UL) transmission via the at least one second beam.

17. The method of claim 16, wherein the MPE report is received via a medium access control (MAC) control element (CE) in a physical uplink shared channel (PUSCH), and wherein the PUSCH has a hybrid automatic repeat request (HARQ) identity document (ID).

18. The method of claim 16, wherein the MPE report is received with a power headroom report (PHR) indicating power management maximum power reduction (P-MPR) values for different UL beams to a cell.

19. The method of claim 17, wherein the response is transmitted via a downlink control information (DCI) scheduling another PUSCH having a same HARQ ID as the PUSCH carrying the MPE report, and wherein the DCI indicates a new data assignment indicator.

20. The method of claim 16, wherein the MPE report further indicates a third beam for a first component carrier (CC1) and a fourth beam for a second component carrier (CC2).

21. The method of claim 20, wherein the network entity receives a first UL transmission using the third beam on the CC1 and a second UL transmission using the fourth beam on the CC2.

22. An apparatus for wireless communications by a user equipment (UE), comprising:
at least one processor and a memory configured to:
transmit, to a network entity via a first beam, a maximum permissible exposure (MPE) report indicating at least one second beam, wherein transmission of the MPE report is triggered when a timer associated with the MPE report has expired;
receive, from the network entity, a response indicating an acknowledgment of the MPE report; and
transmit, to the network entity, an uplink (UL) transmission using the at least one second beam.

23. The apparatus of claim 22, wherein the MPE report is transmitted via a medium access control (MAC) control element (CE) in a physical uplink shared channel (PUSCH), and wherein the PUSCH has a hybrid automatic repeat request (HARQ) identity document (ID).

24. The apparatus of claim 22, wherein the MPE report is transmitted with a power headroom report (PHR) indicating power management maximum power reduction (P-MPR) values for different UL beams to a cell.

25. The apparatus of claim 22, wherein the MPE report is transmitted in response to detecting an MPE event, on one of multiple component carriers (CCs) configured with a cell in a carrier aggregation (CA), indicating a change in at least one of pathloss or power management maximum power reduction (P-MPR) values beyond a threshold.

26. An apparatus for wireless communications by a network entity, comprising:
at least one processor and a memory configured to:
receive, from a user equipment (UE) via a first beam, a maximum permissible exposure (MPE) report indicating at least one second beam, wherein the MPE report is received when a timer associated with the MPE report has expired;
transmit, to the UE, a response indicating an acknowledgment of the MPE report; and
receive, from the UE, an uplink (UL) transmission via the at least one second beam.

27. The apparatus of claim 26, wherein the MPE report is received via a medium access control (MAC) control element (CE) in a physical uplink shared channel (PUSCH), and wherein the PUSCH has a hybrid automatic repeat request (HARQ) identity document (ID).

28. The apparatus of claim 26, wherein the MPE report is received with a power headroom report (PHR) indicating power management maximum power reduction (P-MPR) values for different UL beams to a cell.

29. The apparatus of claim 26, wherein the response is transmitted via a downlink control information (DCI) scheduling another PUSCH having a same HARQ ID as the PUSCH carrying the MPE report, and wherein the DCI indicates a new data assignment indicator.

* * * * *